United States Patent
Gallegos-Lopez et al.

(10) Patent No.: US 6,342,772 B1
(45) Date of Patent: Jan. 29, 2002

(54) DRIVE CIRCUIT AND METHOD FOR DRIVING A SWITCHED RELUCTANCE MACHINE

(75) Inventors: Gabriel Gallegos-Lopez, Alexandria; Ronald John Krefta, Noblesville, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/765,746

(22) Filed: Jan. 19, 2001

(51) Int. Cl.$^7$ ............................................... H02P 5/28
(52) U.S. Cl. ........................................ 318/701; 318/254
(58) Field of Search ................................. 318/701, 254

(56) References Cited

U.S. PATENT DOCUMENTS

| | | | |
|---|---|---|---|
| 5,084,662 A | * 1/1992 | Palaniappan et al. | 318/701 |
| 5,522,653 A | 6/1996 | Fulks et al. | 303/162 |
| 5,525,886 A | * 6/1996 | Lyons et al. | 318/701 |
| 5,627,444 A | 5/1997 | Fulks | 318/701 |
| 5,900,712 A | * 5/1999 | Disser et al. | 318/701 |
| 6,046,561 A | 4/2000 | Zup et al. | 318/439 |
| 6,054,819 A | * 4/2000 | Pengov | 318/254 |
| 6,060,858 A | * 5/2000 | Blackburn et al. | 318/701 |
| 6,137,256 A | * 10/2000 | Morris | 318/701 |

* cited by examiner

*Primary Examiner*—Marlon T. Fletcher
*Assistant Examiner*—Rita Leykin
(74) *Attorney, Agent, or Firm*—Margaret A. Dobrowitsky

(57) ABSTRACT

Drive circuit and method for driving a switched reluctance machine having at least two winding per pole are provided. The circuit includes first and second direct current links. The circuit further includes a first winding having first and second terminals. The first winding is connectable across said first and second links. A first switch is coupled across the first link and the first terminal of the first winding. A second switch is coupled across the second terminal of the first winding and the second link. A second winding is connectable in series circuit to that first winding. The second winding has first and second terminals. A third switch is coupled across one of the first and second links and the second terminal of the second winding. Each of the switches is responsive to a respective gating signal to selectively energize and deenergize one of the windings when the machine operates in a first mode of operation and to selectively energize and deenergize both of said windings when the machine operates in a second mode of operation.

21 Claims, 3 Drawing Sheets

(a)

(b)

(c)

(d)

DRIVE CIRCUIT AND METHOD FOR DRIVING A SWITCHED RELUCTANCE MACHINE

BACKGROUND OF THE INVENTION

The present invention is generally related to drive circuits for electromechanical machines, and, more particularly, the present invention is related to an improved drive circuit topology that uses a split winding for driving a switched reluctance machine.

FIG. 1 shows a standard drive circuit topology 10 generally used to drive a switched reluctance machine and referred in the art as asymmetric bridge. FIG. 1 shows the drive circuit topology as applied to a single phase of a polyphase switched reluctance machine and, as shown in FIG. 1, such circuit topology includes two power switches and two power diodes per motor phase. As will be readily understood by those skilled in the art, power is supplied to a motor phase winding 12 from a direct current (DC) source, such as a battery (not shown). A capacitor 11 is connected across first and second supply links 14 and 16. Winding 12 is connected across links 14 and 16 by upper and lower switches 17 and 18. Diodes 20 and 22, generally referred to in the art as "free-wheeling" diodes, circulate inductive current in the phase winding when one or both of the respective switches are turned off. In operation, phase winding 12 is energized by turning on switches 17 and 18. Current in the phase winding may be regulated, based on a suitable regulation technique, such as pulse-width-modulation (PWM), by sending the PWM signals to either of switches 17 or 18. Winding current during off periods of the PWM may be re-circulated through the conductive switch and one of the free-wheeling diodes 20 or 22. This is called zero voltage loop. When both upper and lower switches 17 and 18 are turned off to terminate the energization interval, both free-wheeling diodes 20 and 22 may conduct to return winding current to the DC source.

One issue with drive circuit 10 is that if higher power is required for a given machine, the power rating of each silicon-based power device needs to be increased proportionally. This may force the designer to use higher-power-rated devices to account for worst-case scenarios and generally results in higher costs. In view of the foregoing, it would be desirable to provide an improved drive circuit topology that is able to boost torque for a motoring mode or generated current for a generating mode without increase of the power rating of the power devices. This would result in more efficient use of the silicon-based devices, and would lower costs of the drive circuit.

BRIEF SUMMARY OF THE INVENTION

Generally speaking, the present invention fulfills the foregoing needs by providing in one aspect thereof a drive circuit for a switched reluctance machine having at least two windings per pole. The circuit includes first and second direct current links. The circuit further includes a first winding having first and second terminals. The first winding is connectable across said first and second links. A first switch is coupled across the first link and the first terminal of the first winding. A second switch is coupled across the second terminal of the first winding and the second link. A second winding is connectable in series circuit to that first winding. The second winding has first and second terminals. A third switch is coupled across one of the first and second links and the second terminal of the second winding. Each of the switches is responsive to a respective gating signal to selectively energize and deenergize one of the windings when the machine operates in a first mode of operation and to selectively energize and deenergize both of said windings when the machine operates in a second mode of operation.

The present invention further fulfills the foregoing needs by providing a method for driving a switched reluctance machine having at least two windings per pole. The method allows for providing first and second direct current links. The method further allows for providing a first winding having first and second terminals. The first winding is connectable across said first and second links. A first switch is coupled across the first link and the first terminal of said first winding. A second switch is coupled across the second terminal of said first winding and the second link. The method further allows for providing a second winding connectable in series circuit to the first winding. The second winding has first and second terminals. A third switch is coupled across one of the first and second links and the second terminal of said second winding. Each of the switches is responsive to a respective gating signal to selectively energize and deenergize one of the windings when the machine operates in a first mode of operation and to selectively energize and deenergize both windings when the machine operates in a second mode of operation.

DETAILED DESCRIPTION OF THE INVENTION

Figure 2:
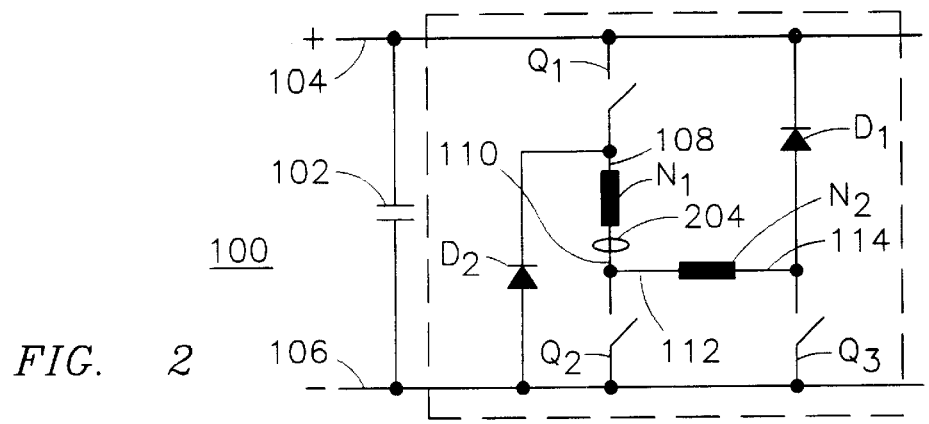
FIG. 2 shows a schematic of an exemplary circuit topology embodying one aspect of the present invention.

The present invention in one aspect thereof proposes an improved topology for the drive circuit of a switched reluctance machine (SRM). One exemplary embodiment of the improved drive circuit 100 is illustrated in FIG. 2 where, for the sake of simplicity of illustration, only one phase is shown. As shown in FIG. 2, a capacitor 102 is connected across first and second supply links 104 and 106. By way of example, first link 104 may comprise a positive polarity link, and second link 106 may comprises a negative polarity link. The winding of each pole comprises a first winding N1 having first and second terminals 108 and 110 connectable across links 104 and 106 by first and second switches Q1 and Q2. By way of example, first switch Q1 is coupled across first link 104 and the first terminal 108 of first winding N1, and second switch Q2 is coupled across second link 106 and the second terminal 110 of first winding N1. The winding of each pole further comprises a second winding N2 connectable in series circuit to first winding N1. The second winding includes first and second terminal 112 and 114. In one exemplary embodiment, the number of turns of winding N1 is greater than or equal that the number of turns of winding N2.

A third switch Q3 is coupled across one of the first and second links, e.g., link 106, and the second terminal 114 of winding N2. As further described below, each of switches Q1–Q3 is responsive to a respective gating signal to energize and deenergize one of such windings (e.g., winding N1) when the machine is in a first mode of operation and to selectively energize and deenergize both of windings N1 and N2 when the machine is in a second mode of operation. By way of example, the first mode of operation may correspond to a relatively high speed operation wherein winding N1 is energized. The second mode of operation may correspond to a relatively low speed operation wherein windings N1 and N2 are excited in series.

Drive circuit 100 further includes a first diode D1 coupled across one of the supply links and the second terminal 114 of the second winding N2. For example, as shown in FIG. 2, first diode D1 has its cathode terminal coupled to link 104 and further has its anode terminal coupled to the second terminal 114 of winding N2.

A second diode D2 is coupled across one of the terminals of the first winding and one of the supply links. For example, as shown in FIG. 2, second diode D2 has its anode terminal coupled to link 106 and further has its cathode terminal coupled to the first terminal 108 of winding N1.

As shown in FIGS. 5–10, a third diode D3 is optionally coupled across one of the supply links and the first terminal of the second winding N2. For example, in FIGS. 5–10, third diode D3 has its anode coupled to the first terminal 112 of winding N2 and has its cathode terminal coupled to link 104. The optional diode D3 may be used in case that the mutual electromagnetic coupling between windings N1 and N2 were less than a desired substantially high level for such electromagnetic coupling.

Figure 3:
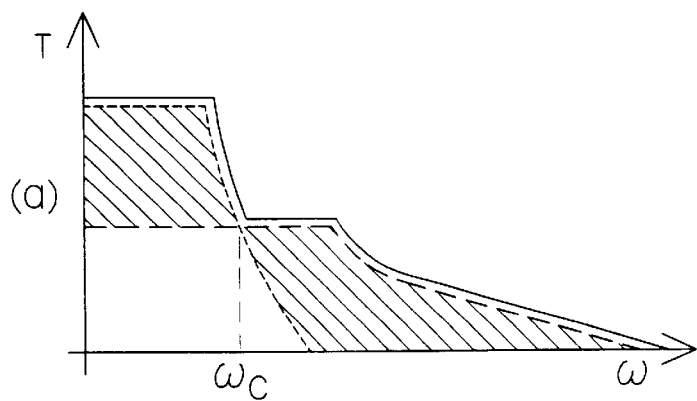
FIG. 3 illustrates exemplary torque and speed characteristics enabled by the circuit topology of FIG. 2 during motoring.
Figure 4:
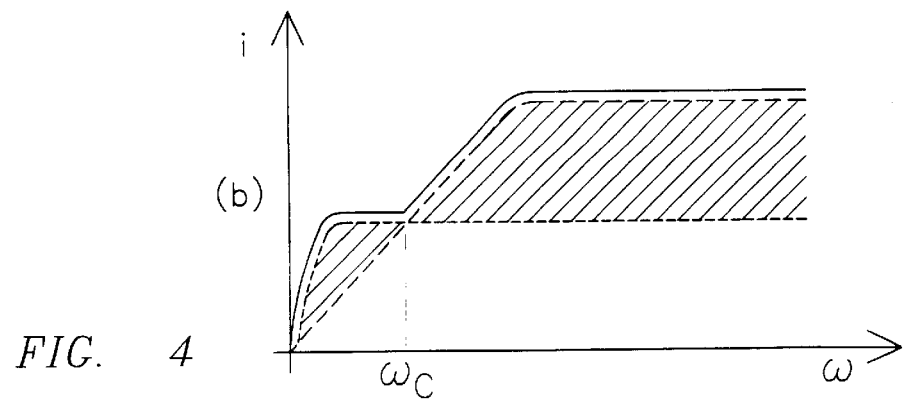
FIG. 4 illustrates exemplary current and speed characteristics enabled by the circuit topology of FIG. 2 during power generation.

FIG. 3 shows an exemplary plot of torque and speed plots during motoring and FIG. 4 shows an exemplary plot of Link or DC current and speed during power generation for the improved topology of the present invention. In FIGS. 3 and 4, the dashed line represents the characteristic of the machine when only first winding N1 is energized. By way of comparison, the dotted line represents machine characteristics results when first and second windings N1 and N2 are both excited in series. The exemplary plots of FIGS. 3 and 4 correspond to a case where the number of turns of winding N1 is equal to the number of turns of winding N2. It will be appreciated, however, that the present invention is not limited to any particular arrangement regarding the number of turns of either of the windings relative to the number of turns of the other winding. It will be appreciated that the drive circuit of the present invention is switchable between the characteristics shown in FIGS. 3 and 4. The overall machine characteristic results in the solid line shown in FIGS. 3 and 4. The area represented by the left-tilted pattern represents the boost in torque and generated current achieved by the drive circuit of the present invention at low speed. The area represented by right-tilted pattern represents the boost in torque and generated current enabled by the drive circuit of the present invention at high speed, such as may occur when operating in the field-weakening region.

FIGS. 5–10 illustrates current flow during various exemplary states of drive circuit 100 that correspond to respective component conditions listed in the following table:

TABLE 1

| Q1 | Q2 | Q3 | D1 | D2 | D3 | N1 | N2 | State FIG. |
|---|---|---|---|---|---|---|---|---|
| On | On | Off | Off | Off | Off | Vdc | 0 | (a) 5 |
| Off | Off | Off | On | On | On | -Vdc | 0 | (b) 6 |
| On | Off | Off | On | Off | On | 0 | 0 | (c) 7 |
| On | Off | On | Off | Off | Off | $V_{dc}\left(\frac{Z1}{Z1+Z2}\right)$ | $V_{dc}\left(\frac{Z2}{Z1+Z2}\right)$ | (d) 8 |
| Off | On | Off | Off | On | Off | 0 | 0 | (e) 9 |
| Off | Off | On | Off | On | Off | 0 | 0 | (f) 10 |

Figure 5:
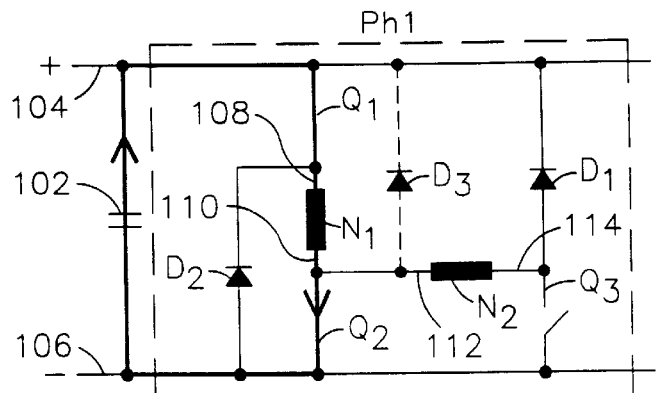
FIGS. 5–10 illustrate various exemplary states that are achievable with the circuit topology of FIG. 2.
Figure 6:
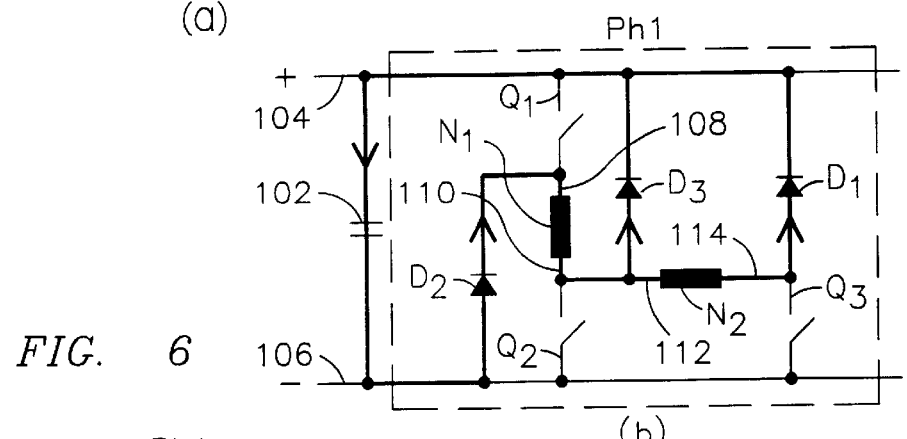
Figure 7:
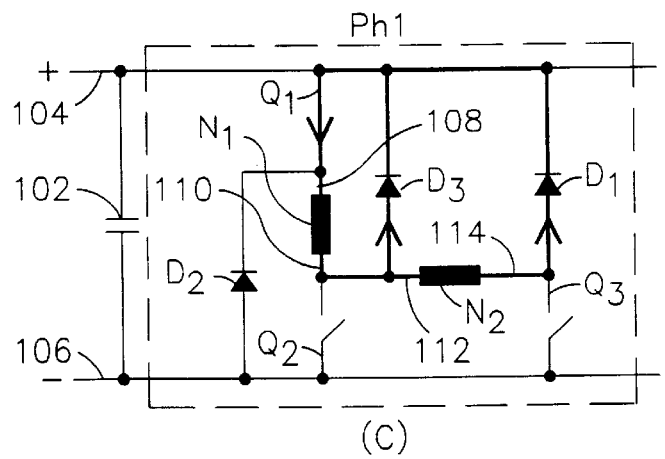
Figure 8:
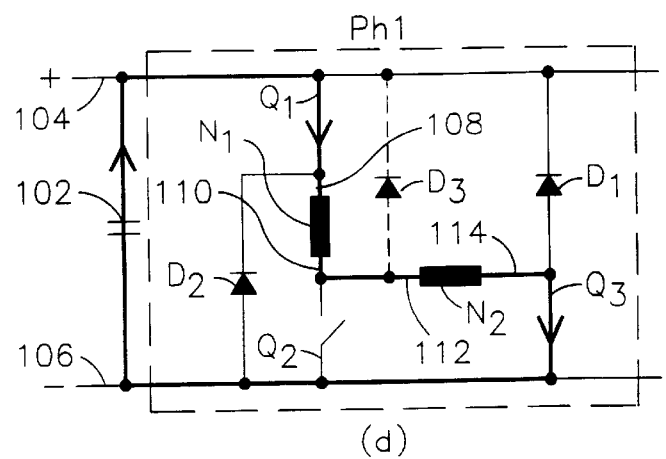
Figure 9:
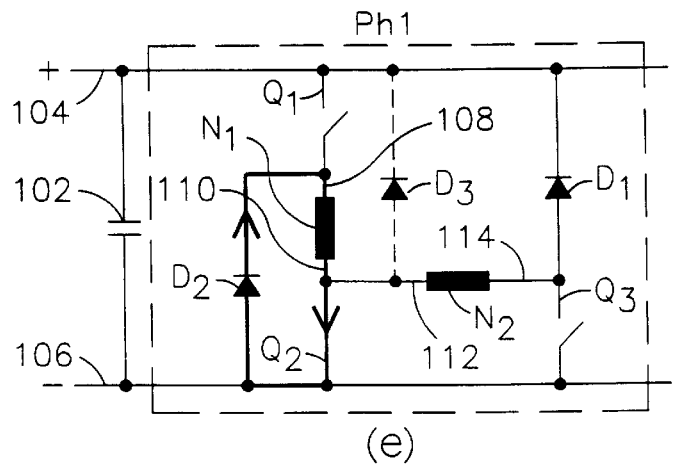
Figure 10:
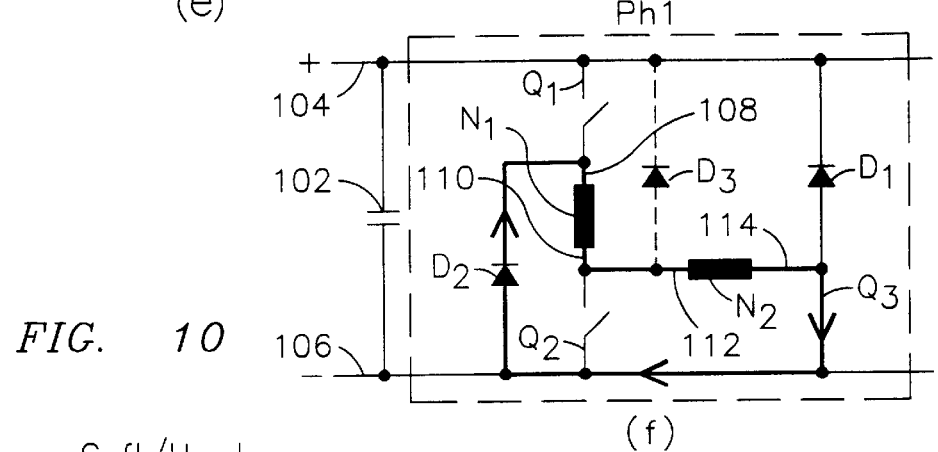

As seen in FIG. 5, energization of first winding N1 corresponds to state (a). As seen in FIG. 8, energization of first and second windings N1 and N2 corresponds to state (d). FIGS. 6, 7, 9, and 10 respectively correspond to states (b), (c), (e) and (f) wherein circulation of inductive current is provided by free-wheeling diodes D1–D3. As will be appreciated by those skilled in the art, "soft chopping" corresponds to respective states (c), (e), and (f) and "hard chopping" corresponds to state (b).

As used herein "hard-chopping" refers to the use of positive and negative voltages to regulate the current in a winding. The positive voltage is applied when the switch connected to the positive rail and the switch connected to the negative rail are both turned on in order to energize that winding. The negative voltage is applied when both these switches are turned off in order to de-energize that winding. The inductive current freewheels through both the diode connected to the positive rail, and the diode connected to the negative rail. As will be further appreciated by those skilled in the art, "soft chopping" refers to the use of zero voltage, and positive and negative voltages to regulate the current in a winding. The positive voltage and negative voltages are obtained in the same way as described above in the context of hard chopping. The zero voltage is applied when only one switch is turned on, and at least one diode is conducting. The inductive current freewheels through one switch and at least one diode.

Figure 11:
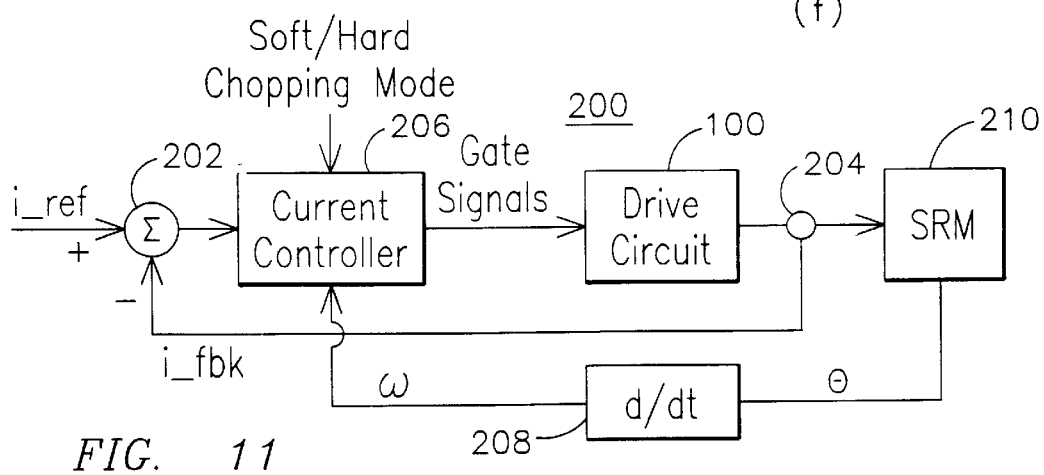
FIG. 11 illustrates a system block diagram embodying other aspects of the present invention.

FIG. 11 illustrates a block diagram representation of an exemplary power conversion system 200 that embodies one aspect of the present invention. As shown in FIG. 11, a summer 202 receives signal i_ref indicative of a current command. Summer 202 further receives a feedback signal i_fbk, such as may be measured by a current sensor 204. The output signal from summer 202 is supplied to a current controller 206 that also receives a signal indicative of rotor speed ω from a differentiator 208. By way of example, rotor speed may be determined by mathematically differentiating a signal θ indicative of rotor position of a switched reluctance machine 210. Current controller 206 is configured to generate the gating signals respectively applied to switches Q1–Q3 to set drive circuit 100 in a respective one of the states illustrated in FIGS. 5–10. In one exemplary embodiment, the gating signals are generated based on the following parameters: rotor speed, the level of current that actually flows through the split windings relative to the current command signal, and the chopping mode being executed, that is, whether hard chopping or soft chopping is being executed.

Figure 12:
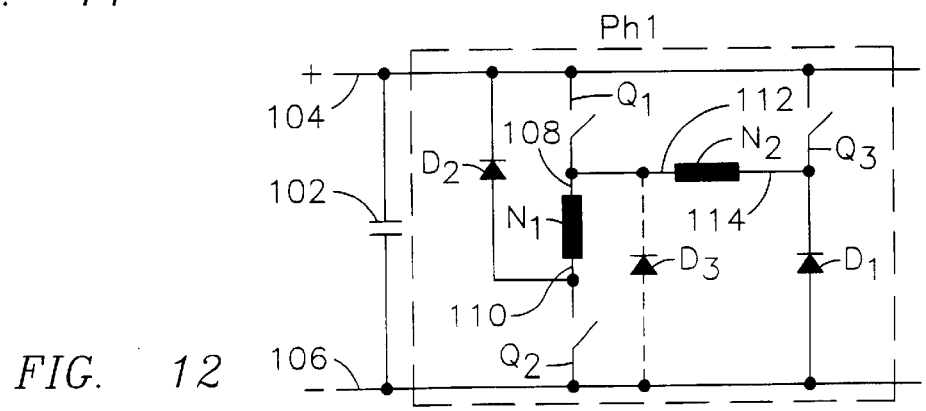
FIG. 12 shows a schematic of another exemplary circuit topology that may be used for practicing the present invention.

FIG. 12 illustrates another exemplary embodiment for the improved drive circuit of the present invention. As shown in FIG. 12, in this embodiment, first diode D1 has its anode terminal coupled to link 106 and further has its cathode terminal coupled to the second terminal 114 of winding N2. Further, second diode D2 has its anode terminal coupled to second terminal 110 of winding N1 and has its cathode terminal coupled to link 104. Optional third diode D3 has its anode coupled to link 106 and has its cathode terminal coupled to the first terminal 112 of winding N2. It will be appreciated that other operational interrelationships and torque/current boosting capabilities enabled by the embodiment of FIG. 12 are as described in the context of the embodiment of FIG. 2, and therefore such interrelationships will not be repeated.

Figure 1:
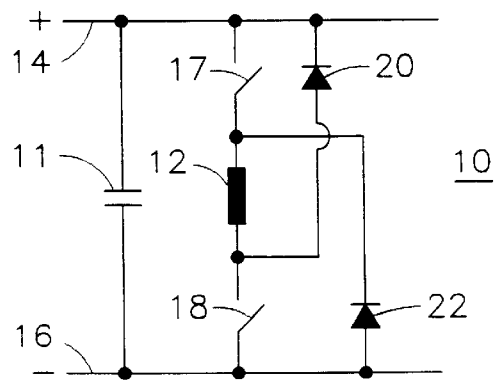
FIG. 1 shows a schematic of a prior art topology of a drive circuit for a switched reluctance machine.

As suggested above, the prior art device of FIG. 1 can only provide the torque/current characteristics represented by either the dashed line or the dotted line in FIGS. 3 and 4, but not both. To obtain, however, the incremental boost depicted by the dotted line in FIGS. 3 and 4 would require to double the ratings of the silicon-based devices used in such prior art architecture, assuming a case where windings N1 and N2 have the same number of turns. By way of comparison, with the topology of the present invention, one can obtain the incremental boost in the low-speed region of operation, that is, below switching point $\omega_c$, by adding one controllable switch and, optionally adding, one diode without having to change the ratings of any of the devices used to drive a given machine. Consequently, due to the use of less silicon, it is believed that the present invention would advantageously result in lower costs.

The present invention can be embodied in the form of microprocessor-implemented processes and apparatus for practicing those processes. The present invention can also be embodied in the form of microprocessor program code containing microprocessor-readable instructions embodied in tangible media, such as floppy diskettes, CD-ROMs, hard drives, or any other computer-readable storage medium, wherein, when the microprocessor program code is loaded into and executed by a microprocessor, the microprocessor becomes an apparatus for practicing the invention. When implemented on a microprocessor, the microprocessor program code segments configure the microprocessor to create specific logic circuits or processing modules.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A drive circuit for a switched reluctance machine having at least two windings per pole, said circuit comprising:
    first and second direct current links;
    a first winding having first and second terminals, said first winding connectable across said first and second links;
    a first switch coupled across the first link and the first terminal of said first winding;
    a second switch coupled across the second terminal of said first winding and the second link;
    a second winding connectable in series circuit to said first winding, said second winding having first and second terminals;
    a third switch coupled across one of the first and second links and the second terminal of said second winding, wherein each of said switches is responsive to a respective gating signal to selectively energize and deenergize one of said windings when the machine operates in a first mode of operation and to selectively energize and deenergize both of said windings when the machine operates in a second mode of operation.

2. The circuit of claim 1 further comprising a first diode coupled across one of the first and second links and the second terminal of the second winding.

3. The circuit of claim 2 further comprising a second diode coupled across one of the terminals of the first winding and one of the first and second links.

4. The circuit of claim 3 further comprising a third diode coupled across one of the first and second links and the first terminal of the second winding.

5. The circuit of claim 1 further comprising a controller configured to generate the respective gating signals applied to the switches based on rotor speed.

6. The circuit of claim 5 wherein the generation of said gating signals is further based on the level of current that actually flows through said windings relative to a current command signal.

7. The circuit of claim 6 wherein the generation of said gating signals is further based on a respective chopping mode of operation.

8. A method for driving a switched reluctance machine having at least two windings per pole, said method comprising:
    providing first and second direct current links;
    providing a first winding having first and second terminals, said first winding connectable across said first and second links;
    coupling a first switch across the first link and the first terminal of said first winding;
    coupling a second switch across the second terminal of said first winding and the second link;
    providing a second winding connectable in series circuit to said first winding, said second winding having first and second terminals;
    coupling a third switch across one of the first and second links and the second terminal of said second winding, wherein each of said switches is responsive to a respective gating signal to selectively energize and deenergize one of said windings when the machine operates in a first mode of operation and to selectively energize and deenergize both of said windings when the machine operates in a second mode of operation.

9. The method of claim 8 further comprising coupling a first diode across one of the first and second links and the second terminal of the second winding.

10. The method of claim 9 further comprising coupling a second diode across one of the terminals of the first winding and one of the first and second links.

11. The method of claim 10 further comprising coupling a third diode across one of the first and second links and the first terminal of the second winding.

12. The method of claim 8 further comprising generating the respective gating signals applied to the switches based on rotor speed.

13. The method of claim 12 wherein said generating of said gating signals is further based on the level of current that actually flows through said windings relative to a current command signal.

14. The method of claim 13 wherein said generating of said gating signals is further based on a respective chopping mode of operation.

15. A computer-readable medium encoded with computer program code for driving a switched reluctance machine having at least two windings per pole, the program code causing a computer to execute a method for controlling a circuit coupled to first and second direct current links, the circuit including a first winding having first and second terminals, said first winding connectable across said first and second links, the circuit further including a second winding connectable in series circuit to said first winding, said second winding having first and second terminals, said method comprising:

coupling a first switch across the first link and the first terminal of said first winding;

coupling a second switch across the second terminal of said first winding and the second link; and coupling a third switch across one of the first and second links and the second terminal of said second winding, wherein each of said switches is responsive to a respective gating signal to selectively energize and deenergize one of said windings when the machine operates in a first mode of operation and to selectively energize and deenergize both of said windings when the machine operates in a second mode of operation.

16. The computer-readable medium of claim 15 further comprising coupling a first diode across one of the first and second links and the second terminal of the second winding.

17. The computer-readable medium of claim 16 further comprising coupling a second diode across one of the terminals of the first winding and one of the first and second links.

18. The computer-readable medium of claim 17 further comprising coupling a third diode across one of the first and second links and the first terminal of the second winding.

19. The computer-readable medium of claim 15 further comprising generating the respective gating signals applied to the switches based on rotor speed.

20. The computer-readable medium of claim 19 wherein said generating of said gating signals is further based on the level of current that actually flows through said windings relative to a current command signal.

21. The computer-readable medium of claim 20 wherein said generating of said gating signals is further based on a respective chopping mode of operation.

* * * * *